United States Patent
Matsukawa

(10) Patent No.: US 7,074,514 B2
(45) Date of Patent: *Jul. 11, 2006

(54) SEPARATOR OF FUEL CELL AND METHOD FOR PRODUCING SAME

(75) Inventor: Masanori Matsukawa, Aichi (JP)

(73) Assignee: Aisin Takaoka Co., Ltd., Toyota (JP)

( * ) Notice: Subject to any disclaimer, the term of this patent is extended or adjusted under 35 U.S.C. 154(b) by 124 days.

This patent is subject to a terminal disclaimer.

(21) Appl. No.: 10/290,522

(22) Filed: Nov. 8, 2002

(65) Prior Publication Data

US 2003/0064278 A1   Apr. 3, 2003

Related U.S. Application Data

(62) Division of application No. 09/708,010, filed on Nov. 8, 2000, now Pat. No. 6,514,400, which is a division of application No. 09/304,951, filed on May 5, 1999, now Pat. No. 6,410,178.

(30) Foreign Application Priority Data

May 8, 1998   (JP)   ................................. 10-125569
May 8, 1998   (JP)   ................................. 10-125572

(51) Int. Cl.
   *H01M 2/00*   (2006.01)
   *H01M 2/02*   (2006.01)
   *H01M 2/14*   (2006.01)

(52) U.S. Cl. ............................. 429/39; 429/34; 429/38
(58) Field of Classification Search .................. 429/39, 429/34, 38; 205/649, 640
   See application file for complete search history.

(56) References Cited

U.S. PATENT DOCUMENTS

| 4,045,312 | A |   | 8/1977 | Satoshi |
| 4,851,090 | A |   | 7/1989 | Burns et al. |
| 5,320,505 | A |   | 6/1994 | Misiak et al. |
| 5,541,015 | A |   | 7/1996 | Tajima et al. |
| 5,641,586 | A |   | 6/1997 | Wilson |
| 5,798,188 | A | * | 8/1998 | Mukohyama et al. ......... 429/34 |
| 6,410,178 | B1 | * | 6/2002 | Matsukawa ................... 429/39 |
| 2001/0001440 | A1 |   | 5/2001 | Wei |

FOREIGN PATENT DOCUMENTS

JP  61-256568 A  11/1986
JP  4-267062 A  9/1992

* cited by examiner

*Primary Examiner*—Patrick Joseph Ryan
*Assistant Examiner*—Julian Mercado
(74) *Attorney, Agent, or Firm*—Buchanan Ingersoll PC

(57) ABSTRACT

For use in a fuel cell, constituted by plural cells, a separator that can reduce fluctuations in electromotive force across respective cells includes a recessed gas path. Depth fluctuations of the gas path can be reduced. It is formed easily even if the separator is formed of a hard material. The gas path having plural depths or gradation can be formed easily. An electrically conductive member, as a separator, and a processing electrode, having patterned electrode projections, are immersed in an electrolytic solution facing each other. Current is fed between the conductive member and electrode for electrolytic processing to dissolve the portion of the conductive member facing the projections, thus forming a gas path having a surface roughness Rz on this bottom surface not larger than 1 μm.

6 Claims, 7 Drawing Sheets

Ra = 0.0861 μm
Rmax = 0.5320 μm
Rz = 0.3000 μm

SEPARATOR OF FUEL CELL AND METHOD FOR PRODUCING SAME

This application is a divisional application of application Ser. No. 09/708,010 filed on Nov. 8, 2000, now U.S. Pat. No. 6,514,400 which is a divisional application of application Ser. No. 09/304,951 filed on May 5, 1999, now U.S. Pat. No. 6,410,178.

FIELD OF THE INVENTION

This invention relates to a separator of a fuel cell having a gas path and a producing method thereof. More particularly, it relates to a separator having an electrically conductive member as a basic material, and a producing method thereof.

BACKGROUND

There is so far known a fuel cell for generating electricity utilizing a fuel gas. The fuel cell is usually made up of a large number of cells. For further improving performance of the fuel cell, there is a demand raised for reducing fluctuations in an electromotive force and a voltage from one cell to another.

In producing a groove-shaped gas path in a separator of the fuel cell for industrial application, there are so far known a method for cutting a metal plate, which is to be a separator, using a suitable cutting tool, to form a groove-shaped gas path, a method for press-working a metal plate, which is to be a separator, to form a groove-shaped passage or duct, and a method for etching (or electroless chemical etching) a metal plate, which is to be a separator of chemically excavating a groove-shaped gas path. The method of producing the gas path by etching (that is, presumed as electroless chemical etching) is disclosed in JP Patent Kokai JP-A-4-267062.

SUMMARY OF THE DISCLOSURE

However, in the course of the investigations toward the present invention the following problems have been encountered. Namely, in the fuel cell, the above-mentioned fluctuations in the electromotive force and the voltage, from one cell to another, are caused by factors such as insufficient uniformity in gas flow containing an active material, insufficient uniformity in catalytic activity of each electrode, insufficient uniformity in electrical contact resistance and insufficient control in temperature distribution. Among other possible factors, there is insufficient uniformity in gas flow caused by depth variations in each separator gas path.

With the conventional method for cutting a gas path by machining with a cutting tool, the gas path is cut only little by little, so that the removal rate and hence productivity is low, even though the depth of the gas path can be precisely controlled by fine control techniques. In particular, if the separator is formed of a hard material which cannot be machined easily, the machining time is prolonged, thus lowering the productivity. In drawing an intricate pattern shape of a complicated gas path, the machining time is prolonged, thus again lowering the productivity. In addition, there is a problem that a cutting tool suffers wear through machining. Moreover, working-transmuted layers, possibly giving rise to non-uniform electrical conductivity, or residual stress layers, possibly giving rise to chronological dimensional changes, are liable to be produced.

In a conventional method for forming a gas path by press-working, the separator is susceptible to springback, such that, even if the fuel cell is assembled to high precision, the gas path and the separator tend to be lowered in dimensional stability due to springback. In a fuel cell comprised of a large number of cells with separators laminated each other, the risk is high that the gas path and the separator are lowered in dimensional stability due to superimposed dimensional changes caused by springback of the respective separators. Moreover, since a pattern configuration of the gas path depends on the press-workability, limitations are imposed by press-workability on designing of the pattern configuration of the gas path. Therefore, in designing the pattern configuration of the gas path, it is necessary to take into account the relative ease in press-working in addition to uniformity in the gas flow. Moreover, if a press dies are used for prolonged time, the gas path depth may be varied due to wear caused to the press dies.

In the conventional method for forming a gas path by electroless chemical etching, the gas path depth tends to be fluctuated. Moreover, a gas path having plural depths, or a gas path having a grandient or gradation on its bottom, cannot be formed easily by electroless chemical etching, and is in need of complicated process steps.

In view of the above-described status of the art, it is an object of the present invention to provide a separator of a fuel cell which may be used with advantage for reducing the fluctuations in the power generation and electromotive force from one cell to another.

It is another object of the present invention to provide a producing method for a separator of a fuel cell with which fluctuations in the gas path depth can be reduced, the problem of wear to the machining electrodes can be eliminated, the gas path can be formed easily with an acceptable removal rate even if the separator is formed of a hard material difficult-to-cut, and with which the gas path can be produced easily with plural depths and a desired gradation.

Further objects of the present invention will become apparent in the entire disclosure.

For achieving the above objects, the present inventors have conducted perseverant researches, and found that, if a surface roughness of the recessed gas path of the separator is prescribed to an extremely small value, such as to a value not larger than 1 μm in terms of Rz, the gas flow containing an active material in the gas path is smoothed and uniformed thus advantageously reducing fluctuations in the power generation and electromotive force (voltage) from one cell to another.

In particular, the present inventors have found that, if the recessed gas path is of a shallow depth, such as 2 mm or less or 10 mm or less, the surface roughness of the bottom of the gas path significantly influences the gas flow, and that, if the surface roughness of the bottom of the gas path is prescribed to 1 μm or less in terms of Rz, the gas flow containing the active material is further smoothed and uniformed thus advantageously reducing fluctuations in the power generation and electromotive force from one cell to another. This finding has led to completion of the separator of the present invention.

It is noted that, in a separator adapted for cutting a groove-shaped gas path by machining with a cutting tool, the gas path presents significant surface roughness. In a separator in which a groove-shaped gas path is formed by press-bend-working, micro-sized irregularities tend to be produced under the effect of buckling due to compressive stress at the time of press-bend-working or tensile deformation caused by the tensile stress. In a separator in which a groove-shaped gas path is formed by electroless chemical etching, etching pits tend to be produced to increase the surface roughness.

In one aspect, the present invention provides a separator of a fuel cell defining a recessed gas path in which flows a gas containing an active material, wherein a bottom surface of the gas path has a surface roughness not larger than 1 μm in terms of Rz.

The separator of the present invention is effective to smooth the gas flow containing an active material.

The present inventors have conducted perseverant researches into forming a gas path of a separator of a fuel cell, and found that, for accomplishing the above object, it is meritorious to produce the gas path by electrolytic processing. The present inventors have confirmed this by experiments, and have arrived at the present invention.

Thus, in another aspect, the present invention provides a method for producing a separator of a fuel cell having a recessed gas path in which flows a gas containing an active material. The method includes (a) a step of providing an electrically conductive member which later serves as a separator, and a processing electrode having electrode projections shaped complementarily to a pattern shape of the gas path, (b) a step of placing the electrically conductive member so as to face the electrode projections of the processing electrode, and (c) a step of supplying current to an area between the electrically conductive member and the processing electrode, in a state in which an electrolytic solution is interposed between the electrically conductive member and the electrode projections of the processing electrode, so as to dissolve the electrically conductive member to excavate the gas path in the electrically conductive member.

When the current is supplied between the electrically conductive member and the processing electrode, electrolytic processing of electro-chemically dissolving the electrically conductive member takes place to excavate a groove-shaped gas path in the surface of the electrically conductive member.

The meritorious effect of the present invention are summarized as follows.

With the separator of the present invention, the surface roughness of the bottom of the recessed gas path is prescribed to an extremely small value, thus aiding in smoothing and uniforming the gas flow in the gas path containing the active material.

In particular, if the recessed gas path is of shallow depth such that the gas pathage resistance tends to be affected by surface roughness, the separator of the present invention promotes smoothing and uniforming the gas flow.

Thus, the present separator is meritorious in reducing fluctuations in power generation and electromotive force in each cell to contribute to improved performance of the fuel cell.

Moreover, since the gas path is smooth, expectations may be had of improving corrosion resistance in the gas path to promote smoothing and uniforming the gas stream.

With the present method, it is possible to reduce depth fluctuations in the gas path and hence to minimize the gas path depth fluctuations even if the number of produced separators is increased. The result is that, even if a large number of cells are layered together to constitute a fuel cell, the gas flow containing an active material can be uniformed with advantage in each cell. The result is that fluctuations in power generation or electromotive force in each cell can be reduced with advantage to contribute to improved performance of the fuel cell.

With the inventive method, as distinct from the method of forming the gas path by press-working in constituting the gas path, no significant load is applied to the processing electrode, so that the processing electrode itself is consumed only to a lesser extent. Thus, the processing electrode, once produced, can be used over an extended period of time, such as semi-permanently. The result is that fluctuations in the gas path caused by wear to the processing electrode are minimized.

Moreover, in the present method, exploiting electrolytic processing, it is possible to evade or reduce the influence of hardness of the electrically conductive member as a separator in preparing the gas path, so that the gas path can be formed in a high precision even in case of the hard electrically conductive member. Therefore, the present method can be applied with advantage to the forming of a gas path in an electrically conductive member formed of an alloy material, which is superior in corrosion resistance and therefore is desirable as a separator material but which is not necessarily easy to press-work or cut, such as stainless steel.

In the method of the present invention, the protruding amount of the electrode projections of the processing electrode can be adjusted depending on a desirable site in the gas path. In this case, the gas path can be changed in depth depending on the desirable site in the gas path. That is, the gas path having plural depth values or a gradation can be produced more easily in one step than if the gas path is formed by electroless chemical etching.

PREFERRED EMBODIMENTS OF THE INVENTION

Figure 1:
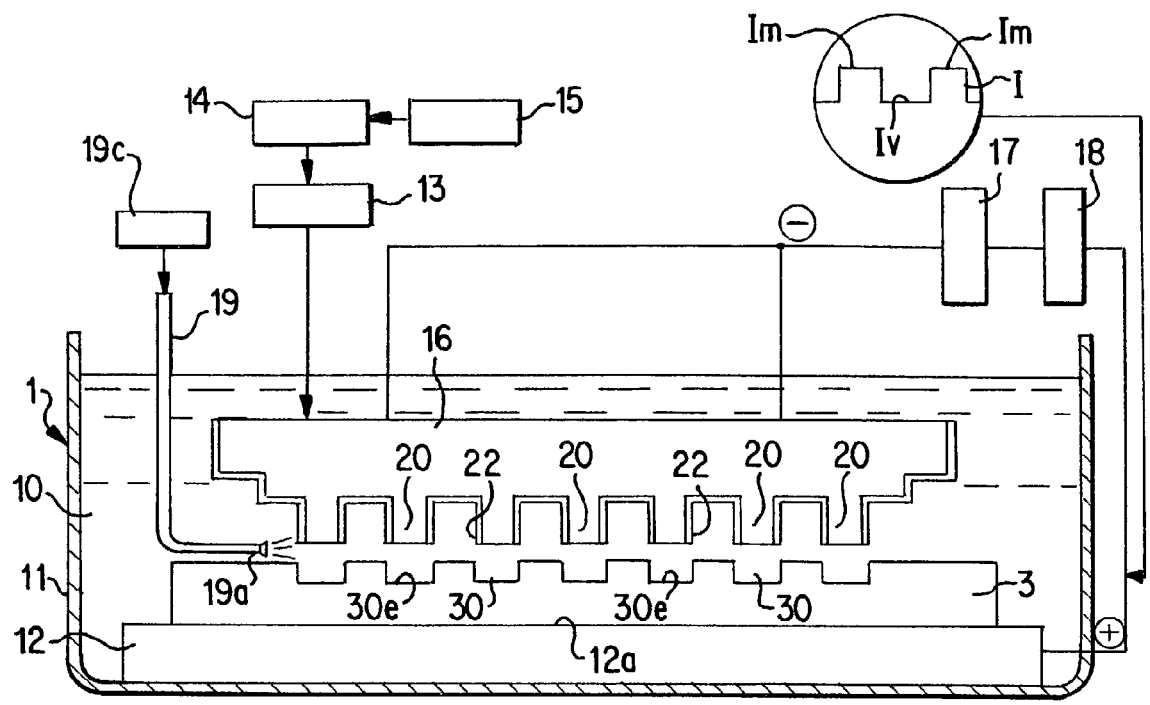
FIG. 1 is a schematic view showing the state of electrolytic processing according to an embodiment of the present invention.

With the separator of the present invention, the surface roughness of the bottom of the recessed gas path in Rz is not larger than 1 µm. The surface roughness is herein defined as being an average value of depths measured at plural points on the bottom of the gas path in view that a distance measured with a surface roughness meter is not that long.

In an embodiment of the separator of the present invention, the surface roughness of the bottom of the recessed gas path can be set to not more than 0.8 µm and to not more than 0.5 µm, and further to not more than 0.4 µm or to not more than 0.3 µm, occasionally to not more than 0.2 µm in Rz.

The surface roughness of the bottom of the gas path can be set to not more than 0.2 µm in Ra and to not more than 0.1 µm in Ra. In terms of Rmax, the surface roughness can be set to not more than 2 µm, to not more than 1 µm, to not more than 0.8 µm or to not more than 0.6 µm. According to JIS, Ra, Rmax and Rz mean the centerline average height, maximum height and 10-point average roughness, respectively.

The gas path depth magnitude can be selected depending on the sorts of the fuel cells. For example, the upper limit value of the gas path depth may be 0.3 mm, 0.5 mm, 0.6 mm, 1 mm, 3 mm, 5 mm, 1 cm, 5 cm or larger or lesser. The lower limit value of the gas path depth may be 0.05 mm, 0.1 mm, 0.2 mm, 0.5 mm, 1 mm, 3 mm, 5 mm, 1 cm or larger or lesser.

For realizing an extremely smooth surface roughness, as discussed above, an electrolytic polishing following rough processing the gas path, or a complex electrolytic polishing (grinding), simultaneously employing micro-sized abrasives, may also be used.

With the separator of the present invention, a groove width of the gas path can be selected optionally to, for example, an illustrative value of 0.1 to 5 mm, not to be limited.

In a present embodiment of the separator of the present invention, an imaginary line extending along the lateral side of a gas path may be set so as to be substantially upright (perpendicular) to the separator surface.

The separator of the present invention is constituted mainly from a metal member as a non-press-worked member. With the non-press-worked member, it is possible to avoid or reduce springback and hence to suppress dimensional changes due to springback.

In an embodiment of a separator of the present invention, an elastic coating layer, such as rubber or resin, may be applied to an outer rim of a metal member having a gas path, in order to make up the separator. The metal member in general is plate-shaped and may be formed, for example, have a carbon steel based material, a stainless steel based material, an aluminium based material, a titanium based material and a copper based material. As the stainless steel based material, the stainless steel based material of austenite, ferrite or martensite structure may be used.

In an embodiment of the separator of the present invention, the depth of the gas path bottom may be varied depending on particular sites of the gas path. For example, the gas path used may have bottom gradation or plural depth stages.

The electrically conductive member, used as a separator in the inventive method, may be formed of a conductive material, although there is no limitation to the shape of the electrically conductive member, a plate-shaped electrically conductive member is preferred.

The processing electrode, used in the method of the present invention, has electrode projections for electrochemically excavating a gas path. It is sufficient if the processing electrode is of an electrically conductive material, such as copper-based material. The amount of protrusion of the electrode projections may be selected optionally, such that its upper limit value may, for example, be 0.5 mm, 1 mm, 3 mm or 10 mm, while its lower limit values may, for example, be 0.1 mm or 0.2 mm. However, these are optional values.

In the inventive method, the electrically conductive member and the processing electrode are arranged facing each other and, with an electrolytic solution interposed therebetween, the current is supplied between the electrically conductive member and the processing electrode to dissolve the electrically conductive member by way of electrolytic processing to constitute a gas path in the electrically conductive member.

Thus, in the inventive method, the current is supplied between the electrically conductive member and the processing electrode. In general, the processing electrode and the electrically conductive member as a workpiece are set to a cathod and to an anode, respectively. The current density, which can be optionally selected depending on the sort of the electrically conductive member, and can be set to, for example, 0.1 to 200 A/cm$^2$, this is not, of course, limitative. As the electrolytic solution, such electrolytic solution that is routinely used in electrolytic processing, such as $NaNO_3$ solution, may be used. The electrolytic solution can be set to an optional temperature, such as 10 to 40° C., but this is not limitative.

In the inventive method, electrolytic products can be removed at least a time point during the electrolytic processing. If the electrolytic products are removed in this manner, the electrolytic processing can be uniformed further. If, for removal, a pulsed current is supplied, the removal operation may be carried out at a trough of the pulsed current when the current supply is at a standstill. Alternatively, the removal operation may be carried out during current supply. The removal operation can be carried out by ejecting an electrolytic solution using ejection means, such as a pump. The time duration of the pulse crest, that of pulse trough or the ratio therebetween can be selected arbitrarily.

According to the inventive method, the amount of protrusion of the processing electrode can be adjusted depending on the site in the gas path. This facilitates formation of the gas path with plural depths.

Thus, with the inventive method, the amount of protrusion of the processing electrode can be adjusted for forming a gradation on the bottom of the gas path. Also, the protruding amount of the processing electrode can be adjusted for forming a partially shallow portion and/or a partially deep portion in the bottom surface of the gas path.

The separator according to the present invention is applied to fuel cells of a solid high molecular type, phosphoric acid type, melted carbonate type, alkali type, methanol direct transmuting type and to other types of the fuel cell.

Specified Embodiments

Referring to the drawings, preferred specified embodiments of the present invention will be explained in detail.

Referring first to FIG. 1, an electrolytic processing device 1 is explained. This electrolytic processing device 1 includes a processing tank 11, in which an electrolytic solution 10 is stored, a base member 12 arranged on the bottom of the processing tank 11 and having a setting surface 12a, a lift head 13 that can be uplifted and downlifted relative to the base member 12, a driving source 14 for uplifting and downlifting the lift head 13, a controller 15 for controlling the driving source 14, a processing electrode 16 removably mounted on the lift head 13, a processing electrode 17 being DC source, a current controller 18, and an ejector 19 having an ejection port 19a for ejecting the electrolytic solution 10.

The electrolytic solution 10 is a solution of sodium nitrate with a concentration of 40 wt %. The base member 12 is connected to an anode side, while the processing electrode 16 is connected to a cathode side. The processing electrode 16 is formed with a plurality of electrode projections 20 having a patterned configuration substantially in register with the patterned configuration of a gas path 30. The end faces of the electrode projections 20 are coated with an electrically conductive plating films 21 of a platinum-based material for improving corrosion resistance. As shown schematically in FIG. 2, the processing electrode 16 has a top surface 16a coated with a masking film 22, while the electrode projection 20 has its lateral side 20a coated similarly with a masking film 22. The masking coat 22 is formed to a thickness of 3 to 10 μm. The masking coat 22 exhibits electrically insulating properties, while exhibiting durability with respect to the electrolytic solution 10. Therefore, the current flows in a concentrated fashion on an end face 20c of the electrode projection 20 in the processing electrode 16.

Figure 2:
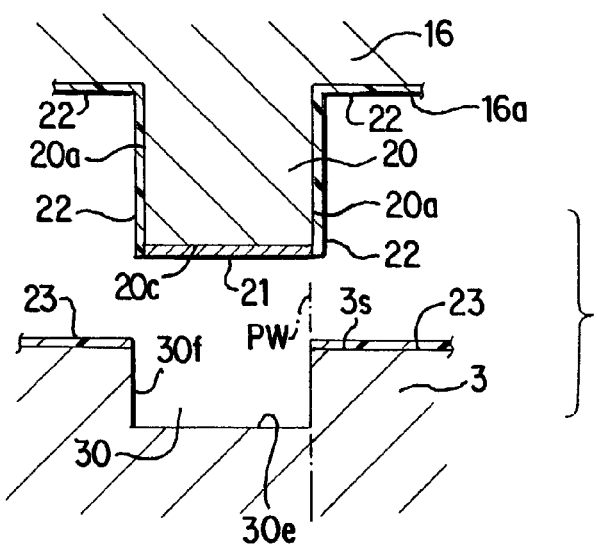
FIG. 2 is an enlarged view showing the vicinity of an electrode projections of a processing electrode shown in FIG. 1.

In the present embodiment, an electrically conductive plate 3, with a thickness of 1 mm, formed of an austenite stainless steel (JIS-SUS304) as a metallic plate, is used as an electrically conductive member. Referring to FIG. 2, the portion of a surface 3s of the electrically conductive plate 3 other than the portion serving as the gas path 30 is coated with a masking coat 23.

Figure 3:
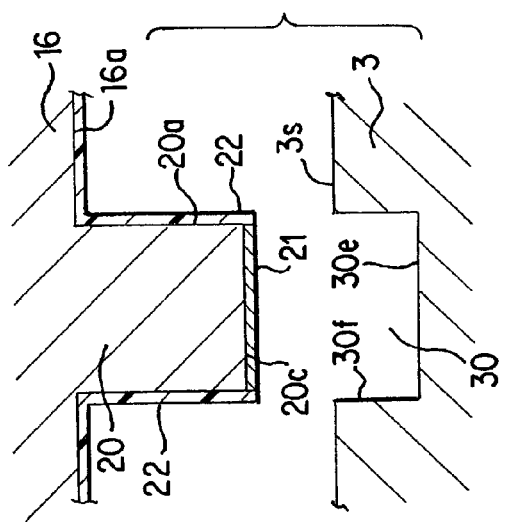
FIG. 3 is an enlarged view showing the vicinity of electrode projections of a processing electrode according to other embodiment of the present invention.

Alternatively, the surface 3s of the electrically conductive plate 3 may not be coated with a masking coat, even though a masking coat 22 is applied to a top surface 16a of the processing electrode 16 and to a side 20a of the electrode projection 20, as shown schematically in FIG. 3.

For electrolytic processing, the electrically conductive plate 3 is set on the setting surface 12a of the base member 12 of the anode side. In this case, the electrically conductive plate 3 is tightly contacted with the base member 12, so that the electrically conductive plate 3 serves ask an anode. In this state, the electrically conductive plate 3 in its entirety is immersed in the electrolytic solution 10. Meanwhile, the electrically conductive plate 3 may be directly connected to an anode terminal.

With the electrically conductive plate 3 facing to the processing electrode 16, the latter is lowered so that a minor gap, between the latter and the former will be of 0.2 to 0.3 mm in general, as the height position of the processing electrode 16 is controlled precisely. The electrically conductive plate 3 and the processing electrode 16, which are caused to approach to each other as described above, need to be out of contact from each other. Across the electrically conductive plate 3 and the processing electrode 16, current is fed to cause elution of the portion of electrically conductive plate 3 which later serves as the gas path 30, by way of electrolytic processing, whereby there is produced the gas path 30, having a pattern configuration complementary to the electrode projections 20 of the processing electrode 16, is formed to a target depth of 0.4 mm.

FIG. 2 schematically shows the conjectured configuration of the gas path 30, which has a bottom surface 30e and a lateral surface 30f.

In the present embodiment, the temperature of the electrolytic solution 10 in electrolytic processing was set to approximately 20° C. A pulse current I, having a current density not less than 40 A/cm$^2$, was caused to flow.

The pulse current I has a pulsed waveform having a crest Im (20 msec) and a trough Iv (5 sec). For the crest Im period, the current density was set to approximately 40 A/cm$^2$. For the trough Iv period, substantially no current is supplied.

At the period of trough Iv, ejection driving means 19c, such as a pump, is actuated to eject the electrolytic solution 10 via an ejection port 19a of the ejector 19 for removing electrolytic products. In the present embodiment, the processing electrode 16 may be suitably uplifted to enlarge the gap between the electrically conductive plate 3 and the processing electrode 16 to improve the performance in removing the electrolytic products.

Main Effect of the Embodiment

The present embodiment, configured for forming the gas path 30 by electrolytic processing, is meritorious in minimizing depth fluctuations of the gas path 30 formed in the electrically conductive plate 3. Our experiments indicated that, with a target depth of the gas path 30 of 0.4 mm, depth variations of the gas path 30 could be reduced to ±0.05 mm, that is to an extremely high precision of approximately ±1.25%. The result is that, even with a fuel cell comprised of a large number of cells, it is possible to reduce the variations in a gas flow containing active materials in each battery cell and hence the fluctuations in the power generation and electromotive force in each cell to improve the performance of the fuel cell.

If the gas path 30 is formed by press-working, the press dies undergo wear, thus raising a problem of variations in the depth of the gas path 30 caused by wear. However, since the processing electrode 16 is kept out of contact with the electrically conductive plate 3 and hence no high mechanical load is applied to the processing electrode 16 to prevent the processing electrode 16 from wearing and damage, with the result that the electrode projections 20 of the processing electrode 16 can be used for prolonged time, for example, semi-permanently. In this sense, depth variation in the gas path 30 can be suppressed meritoriously.

In particular, even if the gas path 30 is of a significantly shallow depth (0.4 mm), as is in the present embodiment, it is possible to reduce fluctuations in the resistance of the gas path 30 against gas flow if the bottom surface 30e of the gas path 30 is smoothed.

Thus, with the present embodiment, the gas flow in the gas path 30 can be smoothed and uniformed in a manner favorable for reducing fluctuations in the generation of electric power and electromotive force in each cell and for improving the performance of the fuel cell.

Moreover, it is possible with the present embodiment to prevent generation on the bottom surface 30e of the working-transmuted layer, residual stress layer or the work hardening layer, which are liable to be produced with the use of mechanical polishing (or grinding) techniques. In addition, grain boundary corrosion due to surface pits can be reduced to improve corrosion resistance in the gas path 30.

Consequently, with the present embodiment, the gas flow in the gas path 30 is smoothed and uniformed, while the variations in the power generation and electromotive force in each cell can be further reduced to improve the performance of the entire fuel cell.

Also, in the present embodiment, the groove width of the gas path 30 can be improved in precision. For example, with a target groove width of the gas path 30 of 1.2 mm, the groove width can be formed to a precision of ±0.005 mm, thus with the precision of ±0.42%.

If the gas path 30 is to be machined by mechanical processing, the gas path 30 with an intricate pattern configuration cannot be produced at a time, and hence is formed only little by little. Thus, the processing time is protracted. However, with the electrolytic processing of the present embodiment, the gas pathes 30 in its entirety can be formed by the processing electrode 16 having electrode projections 20 complementary to the pattern configuration of the gas pathes 30, even if the gas pathes 30 are of an intricate pattern configuration, thus shortening the processing time for the gas pathes 30 to improve the productivity.

In electrolytic processing, the processing speed is affected by the current value, so that, if the current value is increased, the time necessary for forming the gas path 30 can meritoriously be reduced further. Our experiments indicated that, if, in forming the gas path 30 of a depth of 0.4 mm in the flat-plate-shaped electrically conductive plate 3 sized 200 mm by 200 mm, the above-mentioned pulsed current is fed, the time required per one product can be reduced to only a few minutes.

Moreover, in the present embodiment, the gas path 30 can be formed by a small amount of electrolytic processing operations, usually with only one electrolytic processing operation, even if the gas path 30 is varied in depth depending on different sites in the gas path 30, the gas path 30 has plural depths, or if the bottom surface 30e of the gas path 30 presents a gradation, thus again improving the productivity.

Furthermore, with the present embodiment in which the gas path 30 is formed by electrolytic processing, the bottom surface 30e of the gas path 30 can be smoothed, while the bottom surface 30e can be reduced in the surface roughness. Moreover, since the surface of the gas path 30 is smoothed significantly, the risk of grain boundary corrosion is minimized even if the electrically conductive plate 3 is of stainless steel.

Our experiments revealed that the surface roughness Rz of the bottom surface 30e of the gas path 30 was as small as 1 µm or less. More specifically, our experiments revealed that the surface roughness Rz of the bottom surface 30e of the gas path 30 is decreased by one order (digit) of magnitude, that is to approximately 1/8 to 1/15 that of the surface roughness Rz of the electrode projections 20 of the processing electrode 16.

In addition, in the present embodiment, the processing electrode 16 has its top surface 16a coated with the electrically insulating masking coat 22, while the electrode projection 20 has its side 20a similarly coated with the electrically insulating masking coat 22. This is meritorious in setting an imaginary line PW extended from the lateral surface 30f of the gas path 30 upright with respect to the surface 3s of the electrically conductive plate 3 as shown in FIG. 2. This meritorious point is accentuated by the fact that the masking coat 23 is applied to the portions of the surface 3s of the electrically conductive plate 3 other than the surface portion which later serves as the gas path 30.

Test on Surface Roughness

Figure 4:
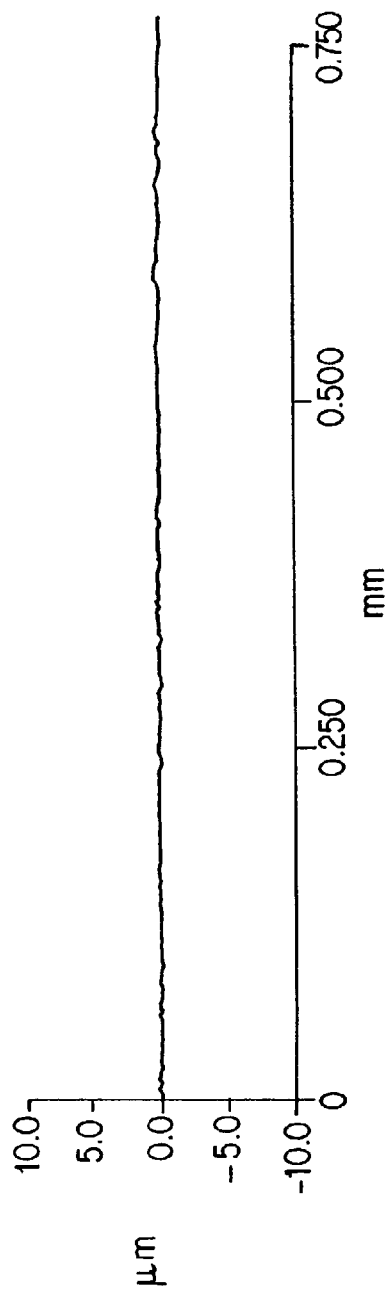
FIG. 4 is a graph showing surface roughness of a gas path produced by electrolytic processing according to an embodiment of the present invention.

For a case where the gas path 30 has been formed on the electrically conductive plate 3 by electrolytic processing, a test was conducted for measuring the surface roughness of the bottom surface 30e of the gas path 30. In this test, the surface roughness of the processing electrode 16 is 3.2 µm in terms of Rz. The electrically conductive plate 3 was formed of austenite stainless steel, with a target depth of the gas path 30 being set to 0.4 mm in order to cope with the current status of the art. The test results are shown in FIG. 4, the ordinate indicating the surface roughness and the abscissa indicating the distance or the position on the bottom surface. As may be seen from FIG. 4 that a characteristic line representing the surface roughness characteristics is planar and smooth. The surface roughness was extremely small, with Ra, Rmax and Rz being 0.0861 µm, 0.5320 µm and 0.3000 µm, respectively. Thus, the surface roughness of the bottom surface 30e of the gas path 30 formed by electrolytic processing is extremely small, with Rz being only of the order of one-tenth of the surface roughness of the processing electrode 16.

Figure 5:
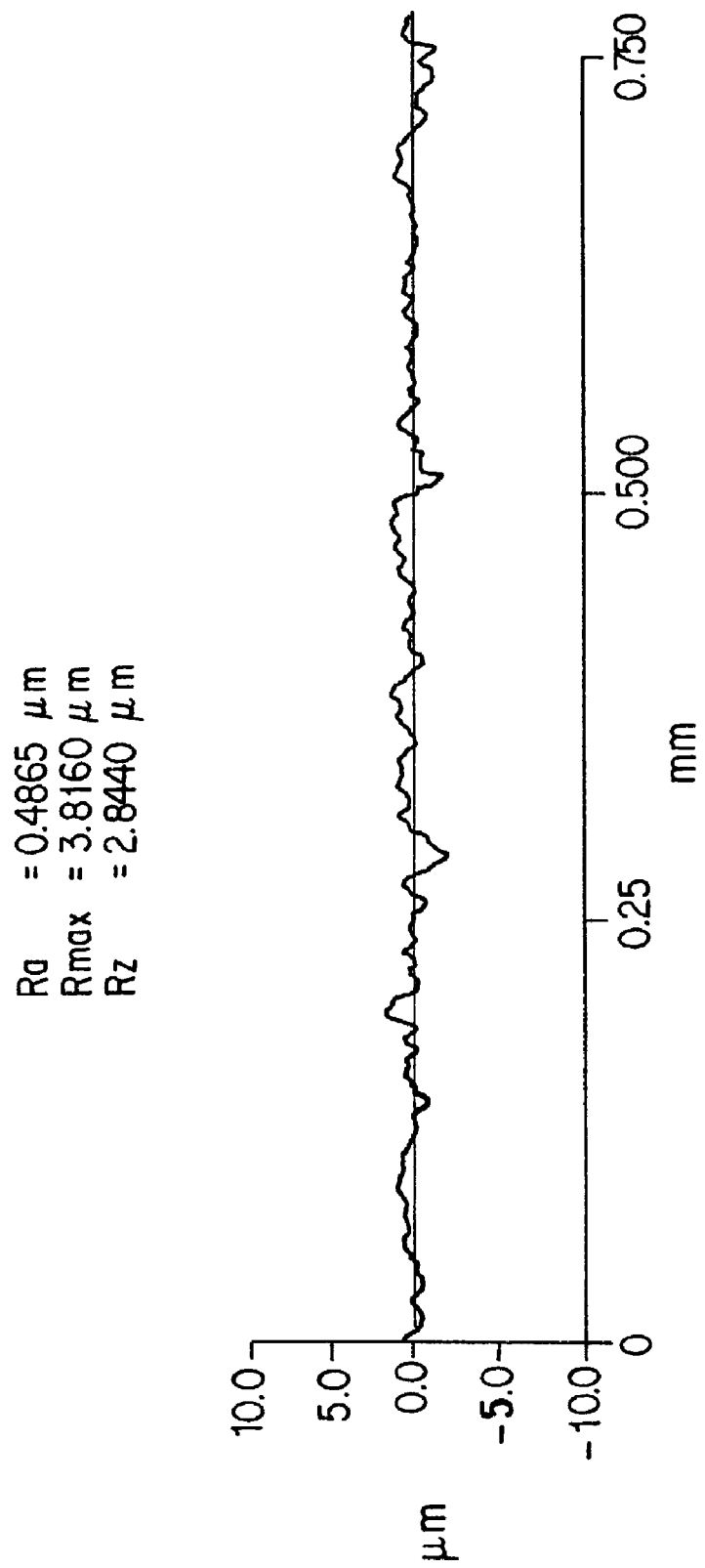
FIG. 5 is a graph showing surface roughness of a gas path produced by etching as a comparative example.

As a Comparative Example, a gas path of an equivalent depth was formed by electroless chemical etching on a comparable electrically conductive plate. In the present Comparative Example, tests for measuring surface roughness were conducted in similar manner. The test results are shown in FIG. 5, in which the ordinate and the abscissa denote the surface roughness and the distance, respectively. As may be seen from FIG. 5, the characteristic line representing the surface roughness was significantly irregular. The surface roughness was significantly larger than that in the case of electrolytic processing, with Ra, Rmax and Rz being 0.4865 µm, 3.8160 µm and 2.8440 µm, respectively.

From the above-mentioned test results, the ratio of Ra by electrolytic processing to Ra by electroless chemical etching was 0.0861 µm/0.4865 µm≈0.18 (approximately 18%), while the ratio of Rmax by electrolytic processing to Rmax by electroless chemical etching was 0.5320 µm/3.81610 µm≈0.14 (approximately 14%) and that of Rz by electrolytic processing to Rz by electroless chemical etching was 0.3000 µm/2.8440 µm≈0.11 (approximately 11%). Thus, the surface roughness by electrolytic processing is 10 to 20% of that by etching (electroless), being of an extremely small magnitude.

EXAMPLE OF APPLICATION

Figure 6:
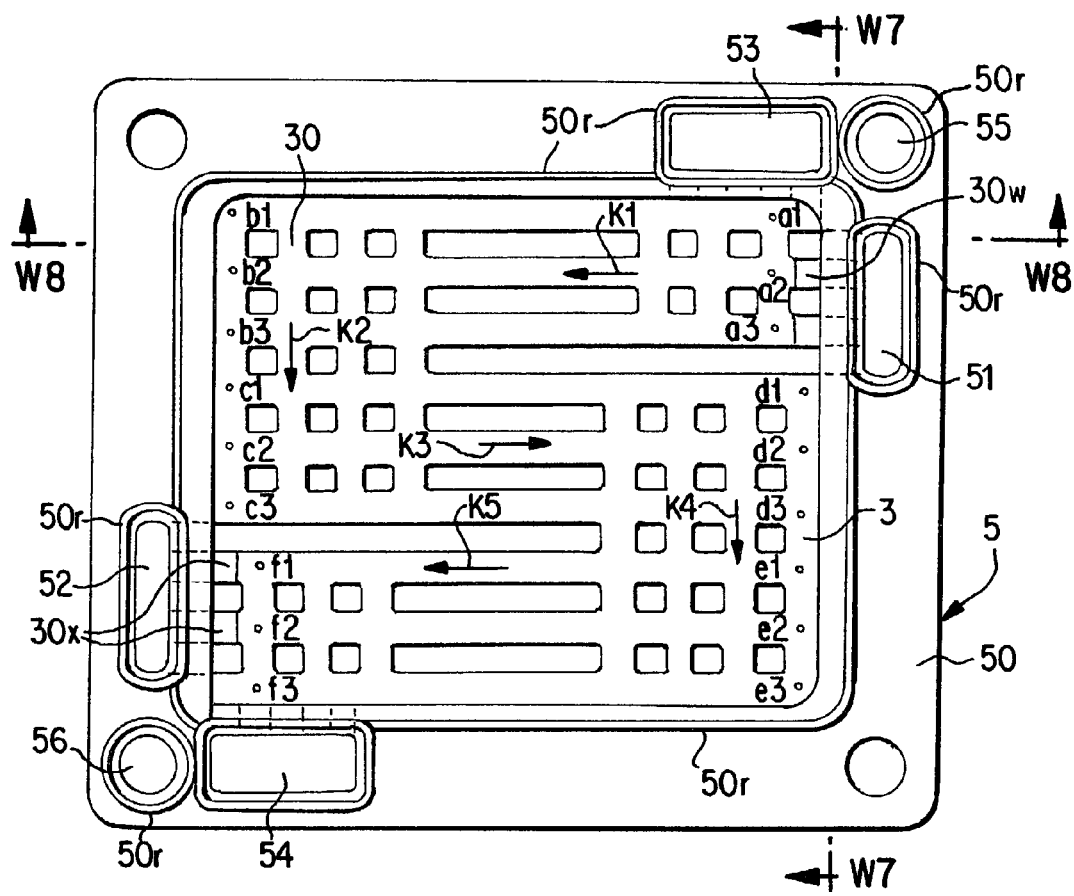
FIG. 6 is a plan view showing a separator embodying the present invention.

FIG. 6 shows a plan view of a separator using the above-mentioned electrically conductive plate 3. This electrically conductive plate 3 is coated with a rubber layer 50 fitted with sealing projection 50r to make up a separator 5 in which a fuel gas inlet 51 and outlet 52 extending in the thickness direction are provided at diagonally opposite positions traversing the separator 5. In addition, an air inlet 53 and an air outlet 54 extending in the thickness direction are formed at diagonally opposite positions traversing the separator 5. Moreover, a cooling medium path 55, 56, extending in the thickness direction are formed at diagonally opposite positions traversing the separator 5. Moreover an inlet and outlet extending in the thickness direction are formed at diagonally opposite positions traversing the separator 5. The fuel gas, introduced via the fuel gas inlet 51, is basically adapted to flow towards the fuel gas outlet 52 along the direction indicated by arrows K1, K2, K3, K4 and K5.

Figure 7:
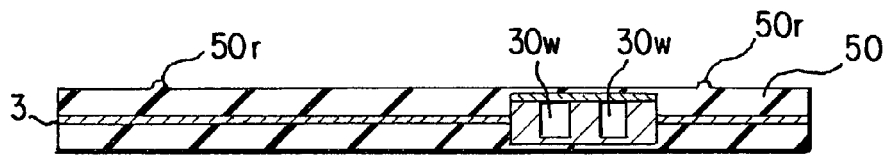
FIG. 7 is a cross-sectional view taken along arrows W7—W7 in FIG. 6.
Figure 8:
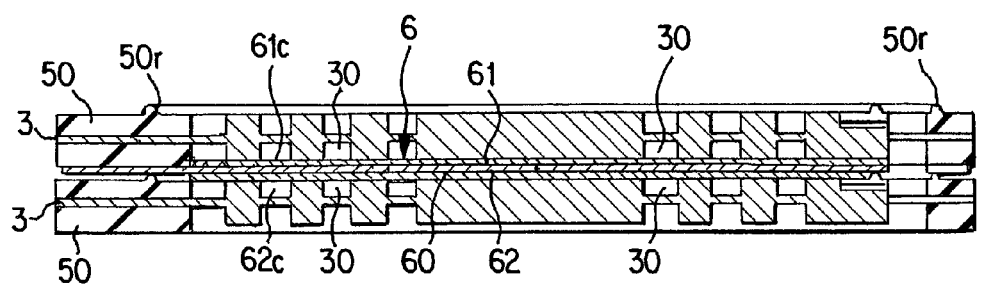
FIG. 8 is a cross-sectional view taken along arrows W8—W8 in FIG. 6.

FIG. 7 is a cross-sectional view taken along arrows W7—W7 of FIG. 6, while FIG. 8 is a cross-sectional taken along arrows W8—W8 in FIG. 6 for illustrating an assembled state. Referring to FIG. 8, a solid electrolyte film 60 of a high-molecular (polymer) material exhibiting proton transmittivity (conductivity) is sandwiched between a positive electrode 61 and a negative electrode 62 to constitute a cell 6. On both side of the cell 6 are layered separators 5. This defines a positive electrode chamber 61c facing the positive electrode 61 and a negative electrode chamber 62c facing the negative electrode 62. The negative electrode chamber 62c is flown through by a gas containing an active material for the negative electrode (hydrogen-containing gas). The positive electrode chamber 61c is flown through by a gas containing active material for the positive electrode (air). A number of the cells 6 and separators 5 are layered together to constitute a fuel cell.

Figure 9:
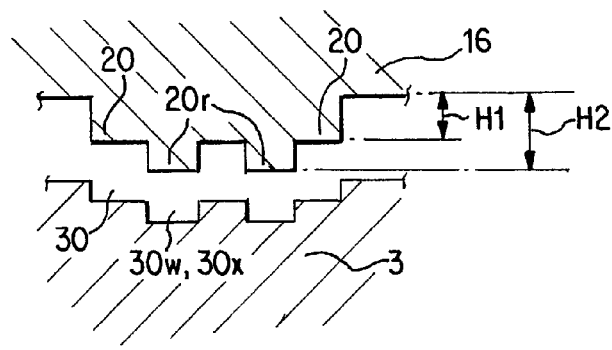
FIG. 9 is a schematic cross-sectional view showing the state of electrolytic processing the vicinity of a multi-stage gas path according to an embodiment of the present invention.

The absolute depth of an inlet side gas path 30w directly communicating with the fuel gas inlet 51 is deeper than the remaining gas pathes 30. Similarly, an outlet side gas path 30x directly communicating with the fuel gas outlet 52 is deeper than the remaining gas pathes 30. The result is that an amount of protrusion H2 of an electrode projection 20r of the processing electrode 16 destined to constitute the gas pathes 30x, 30w is set so as to be larger than an amount of protrusion H1 of the other electrode projections 20, as shown in FIG. 9. This enables two-stage excavation.

In the present embodiment, the depth of the gas path 30 may be configured as shown in FIGS. 10, 11, 12 or 13. In these figures, characteristic lines S1 to S4 indicate the depth of the gas path 30, while the characteristic lines M1 to M4 indicate the amount of protrusion of the electrode projections 20 of the processing electrode 16.

Figure 10:
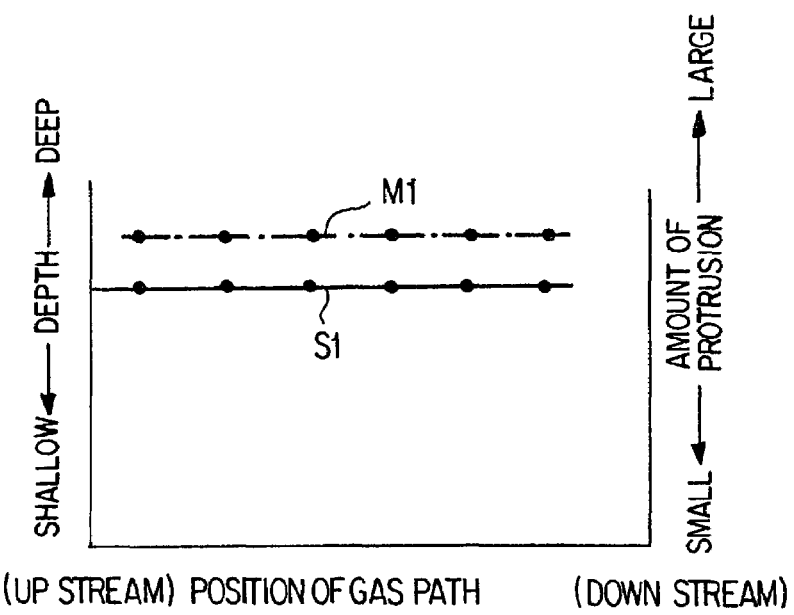
FIG. 10 is a graph showing an example of a gas path depth and a protruding quantity of electrode projections according to the present invention.

In the embodiment shown in FIG. 10, the depth of the bottom surface 30e of the gas path 30 is unchanged, even if the position of the gas path 30 is changed, as indicated by a characteristic line S1. In this case, the amount of protrusion of the electrode projections 20 is unchanged, even if the position of the gas path 30 is changed, as indicated by the characteristic line M1.

Figure 11:
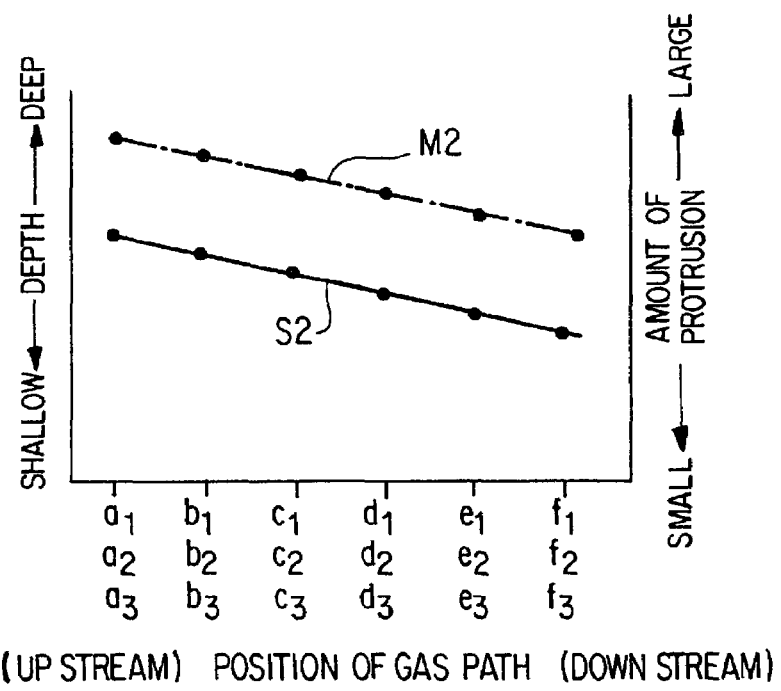
FIG. 11 is a graph showing another example of a gas path depth a the protruding quantity of electrode projections according to the present invention.

In the embodiment shown in FIG. 11, the bottom surface 30e of the gas path 30 includes a gradation, as indicated by the characteristic line S2. In this embodiment, the gradation is such that the bottom surface 30e of the gas path 30 is progressively shallower in depth in a direction proceeding from the fuel gas inlet 51 towards the fuel gas outlet 52, that is along the direction of arrows K1 to K5, in other words, from the upstream side towards the downstream side of the gas flown. That is, as may be understood from the characteristic line S2 of FIG. 11, the bottom surface 30e becomes shallower in depth in a direction proceeding from positions a1, a2, a3 through positions b1, b2, b3, positions c1, c2, c3, positions d1, d2, d3 and positions e1, e2, e3 to positions f1, f2, f3 shown in FIG. 6.

In this case, the electrode projections 20 of the processing electrode 16 present the gradation. That is, as may be understood from the characteristic line M2 in FIG. 11, the amount of protrusion of the electrode projections 20 of the processing electrode 16 becomes progressively smaller in a direction proceeding from the positions a1, a2, a3 through the positions b1, b2, b3, the positions c1, c2, c3, the positions d1, d2, d3 and the positions e1, e2, e3 to the positions f1, f2, f3.

Figure 12:
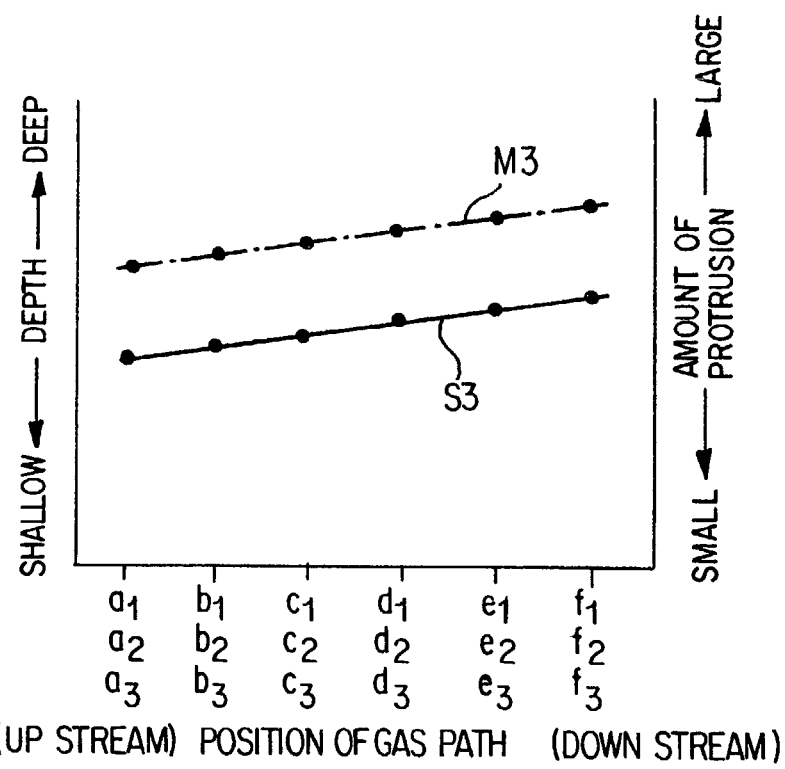
FIG. 12 is a graph showing still another example of the gas path depth and protruding quantity of electrode projections according to the present invention.

In an embodiment shown in FIG. 12, the bottom surface 30e of the gas path 30 includes a gradation, as indicated by the characteristic line S3. In this embodiment, the gradation is such that the bottom surface 30e of the gas path 30 is progressively deeper in depth in a direction proceeding from the fuel gas inlet 51 towards the fuel gas outlet 52, that is along the direction of arrows K1 to K5, in other words, from the upstream side towards the downstream side of the gas stream. That is, as may be understood from the characteristic line S3 of FIG. 12, the bottom surface 36e of the gas path 30 becomes deeper in depth in a direction proceeding from positions a1, a2, a3 through positions b1, b2, b3, positions c1, c2, c3, positions d1, d2, d3 and positions e1, e2, e3 to positions f1, f2, f3.

In this case, the electrode projections 20 of the processing electrode 16 present the gradation. That is, as may be understood from the characteristic line M3 in FIG. 12, the amount of protrusion of the electrode projections 20 of the processing electrode 16 becomes progressively larger in a direction proceeding from the positions a1, a2, a3 through the positions b1, b2, b3, the positions c1, c2, c3, the positions d1, d2, d3 and the positions e1, e2, e3 to the positions f1, f2, f3.

Figure 13:
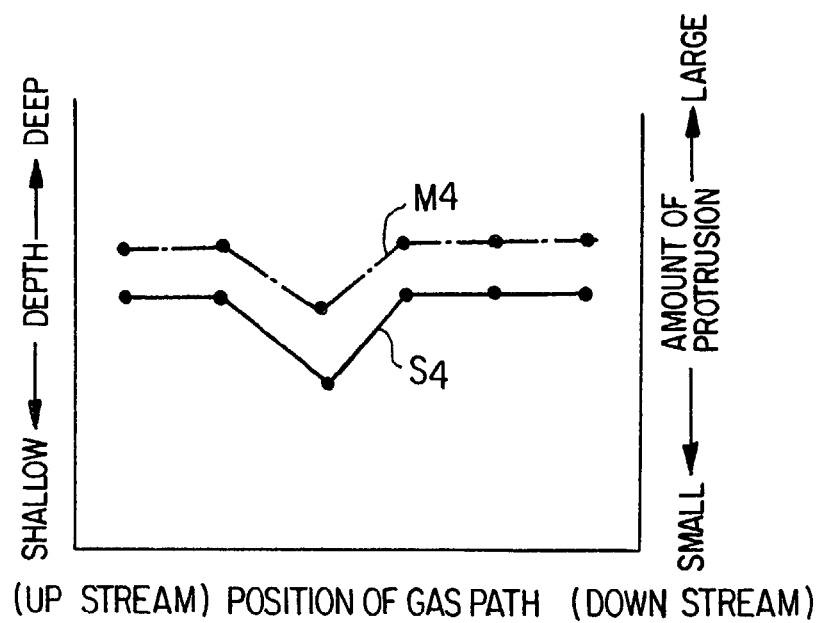
FIG. 13 is a graph showing yet another example of a gas path depth and protruding quantity of electrode projections according to the present invention.

In an embodiment shown in FIG. 13, there is formed a partially shallow portion or bottom surface in the gas path 30, as indicated by a characteristic line S4. In this case, the amount of protrusion of the electrode projection 20 in register with the shallow portion of the gas path 30 is set so as to be shallower than other amounts of protrusion, as indicated by a characteristic line S4.

In the case of electrolytic processing, as distinct from the case of electroless chemical etching, the gas path 30 can be easily changed in depth in a variety of configurations by changing the amount of protrusion of the electrode projections 20 of the processing electrode 16 depending on the desirable positions of the gas path 30.

It may be contemplated that, the active material concentration is lower in the downstream portion than in the upstream portion, as the gas containing an active material flows through the gas path 30. If the gradation is such that the gas path 30 becomes shallower in depth from the upstream side towards the downstream side, as shown in FIG. 11, expectation may be had of realizing the effect of compensating for the lowering of the concentration of the active material in the gas flowing in the gas path 30.

Also, there are occasions wherein undesirable products are yielded in the gas path 30. For example, if the gas path 30 is a path for air, water may be generated in the gas path 30, thus occasionally increasing the volume of the downstream side path. If the gradation is formed so that the gas path 30 will be deeper in a direction proceeding from the upstream side towards the downstream side, as shown in FIG. 12, the downstream side path may be increased in volume without changing the width of the gas path 30.

In the embodiment shown in FIG. 13, the gas path 30 is locally formed with a shallow (or deep) portion. In this shallow portion, the cross-sectional area of the path is partially decreased. Since the fluid flowing speed may be expected to be changed with the decreased conduit cross-section, the above-mentioned products may be expected to be discharged.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A separator of a fuel cell having a recessed gas path through which flows a gas containing an active material, the separator being produced by a method comprising:

providing an electrically conductive member which later serves as a separator, and a processing electrode having electrode projections shaped complementarily to a pattern shape of said gas path;

placing said electrically conductive member so as to face said electrode projections of said processing electrode;

supplying current to an area between said electrically conductive member and the processing electrode, in a state in which an electrolytic solution is interposed between said electrically conductive member and the electrode projections of said processing electrode;

dissolving said electrically conductive member through electrolytic processing to form said gas path as recesses in said electrically conductive member, wherein a bottom surface of said recesses possess a surface roughness Rz of not larger than 1 μm by said electrolytic processing.

2. A separator of the fuel cell as defined in claim 1, wherein electrolytic products generated by electrolytic processing are removed at least at a time during said electrolytic processing.

3. A separator of the fuel cell as defined in claim 1, wherein a protruding amount of the electrode projections of said processing electrode is adjusted depending on particular sites in said gas path, and wherein the gas path is varied in depth depending on the site in the gas path.

4. A separator of the fuel cell as defined in claim 1, wherein said processing electrode comprises a plurality of patterned electrode projections projecting from the base surface of said processing electrode, and wherein the electrode projections protrude from said base surface in varied heights.

5. A separator of a fuel cell having a recessed gas path through which flows a gas containing an active material, the separator being produced by a method comprising:

preparing an electrically conductive member and a processing electrode having electrode projections of a pre-set pattern, a lateral surface of the electrode projections being masked;

facing said electrically conductive member to said electrode projections in close proximity to each other immersed in an electrolytic solution, said electrically conductive member later serving as the separator;

supplying current between said electrically conductive member and the processing electrode to selectively dissolve portions of said electrically conductive member facing said electrode projections thereby forming grooves serving as said gas path; and wherein the bottom surface of said groove possesses a surface roughness Rz of not larger than 1 μm by said electrolytic processing.

6. A separator of the fuel cell as defined in claim 5, wherein on a surface of the electrically conductive member, masking is applied onto portions other than portions serving as said gas path.

* * * * *